Sept. 9, 1952  R. W. HONNIG  2,609,733
METHOD OF MOLDING MAGNESIA INSULATION MATERIAL
Filed Oct. 26, 1945  4 Sheets-Sheet 1

Sept. 9, 1952  R. W. HONNIG  2,609,733
METHOD OF MOLDING MAGNESIA INSULATION MATERIAL
Filed Oct. 26, 1945  4 Sheets-Sheet 2

INVENTOR
ROLAND W. HONNIG.
BY Virgil C. Kline
ATTORNEY

Sept. 9, 1952      R. W. HONNIG      2,609,733
METHOD OF MOLDING MAGNESIA INSULATION MATERIAL Filed Oct. 26, 1945      4 Sheets-Sheet 3

INVENTOR
ROLAND W. HONNIG.
BY Virgil C. Kline
ATTORNEY

Sept. 9, 1952   R. W. HONNIG   2,609,733
METHOD OF MOLDING MAGNESIA INSULATION MATERIAL
Filed Oct. 26, 1945   4 Sheets-Sheet 4

INVENTOR
ROLAND W. HONNIG.
BY Virgil C. Kline
ATTORNEY

Patented Sept. 9, 1952

2,609,733

UNITED STATES PATENT OFFICE 2,609,733

METHOD OF MOLDING MAGNESIA INSULATION MATERIAL

Roland W. Honnig, Plainfield, N. J., assignor to Johns-Manville Corporation, New York, N. Y., a corporation of New York Application October 26, 1945, Serial No. 624,827

14 Claims. (Cl. 92—54)

This invention relates to the manufacture of molded heat insulation blocks, and is particularly directed to improved magnesia insulation blocks and molded articles of exceptionally low density and high strength characteristics, and to a method of manufacturing such blocks.

The present application is a continuation-in-part of my copending application for Molded Heat Insulation and Method of Manufacture, Serial No. 497,561, filed August 5, 1943, now abandoned.

According to the copending application of Hermann F. Vieweg and August M. Dinkfeld, Serial No. 615,278, filed September 10, 1945, now Patent 2,413,958, granted January 7, 1947, for Molded Magnesia Insulation and Method of Manufacture, the solid constituents of a dilute slurry charge comprising normal magnesium carbonate and asbestos fibers are partially dewatered and shaped to final block dimensions under hydrostatic pressure in a filter mold. The shaped wet solids block thus formed is heated to convert the normal carbonate to basic carbonate and to develop a shape retaining set by direct contact with heating fluid, preferably hot water, and this curing operation is completed by heat drying the block. Blocks thus produced do not shrink during curing and drying and require no trimming or surface machining treatment.

An object of the present invention is to provide a magnesia insulation block having comparatively hard, attractive and non-dusting surfaces and which is relatively lighter in weight and stronger than blocks heretofore made by conventional methods.

Another object is to provide a method whereby magnesia insulation blocks of lower density than heretofore made and of relatively high strength may be molded and cured to substantially precise dimensions without material waste and without developing structural weaknesses or serious surface imperfections.

A more particular object is to provide a method whereby magnesia insulation blocks of suitable low density and high strength may be rapidly and economically molded and cured in an operating cycle which is substantially continuous and which may be practiced without providing a large number of individual filter molds.

With the above objects in view, the invention consists in the improved magnesia insulation block and a method of manufacturing same which are hereinafter described and more particularly defined by the appended claims.

In the following description reference will be made to the attached drawings, in which:

Fig. 4 is a perspective view of one end of a low density magnesia insulation block, illustrating by a transverse cross-section the differences in fiber orientation and block density as between the outer shell and the core;

Figure 7:
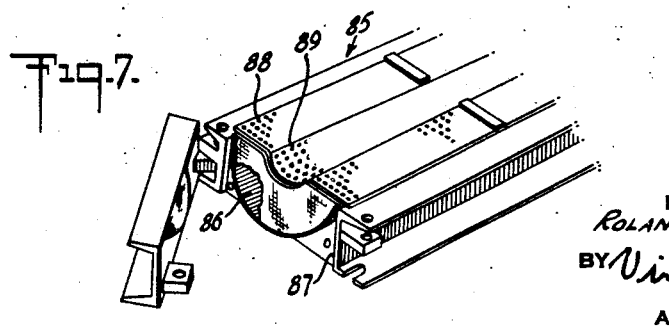
Fig. 7 is a perspective view of one end of an assembled semi-tubular form of filter mold of a type useful with the apparatus of Fig. 5, illustrating the pin coupling hinges permitting rapid assembly and disassembly.
Figure 8:
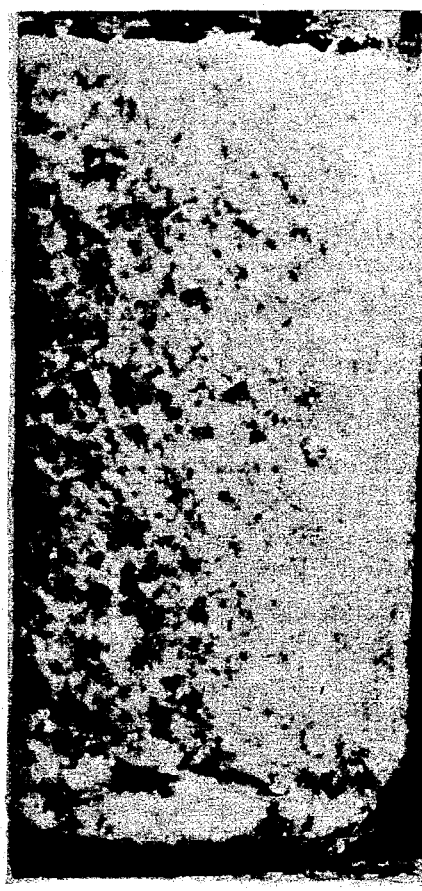
Fig. 8 is a photographic view of a portion of a glass beaker containing an aqueous slurry of normal magnesium carbonate and asbestos in partially reacted flocculent "oatmeal" condition.
Figure 10:
Figure 9:
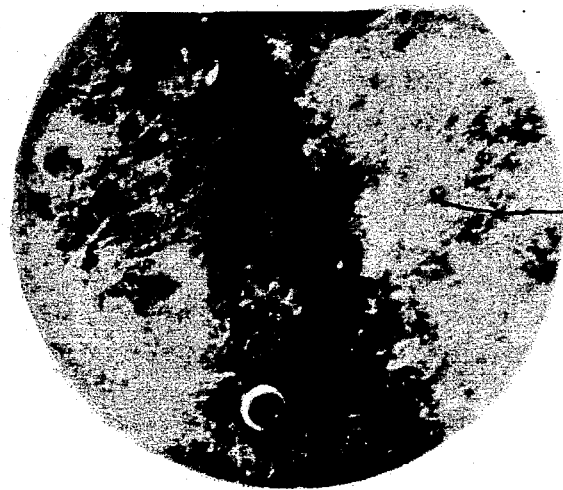

Fig. 9 is a photo-micrographic view (magnification 100×) of an aggregate tuft of microscopic crystals and fibers taken from a slurry in the oatmeal condition shown in Fig. 7; and Fig. 10 is a photo-micrograph at high power (magnification 1000×) showing the manner in which elongated crystals of normal magnesium carbonate and asbestos fibers are clustered and held together by incipient bonds at the points of contact to form the loosely coherent tufts or blocks pictured in Fig. 9.

One reason for failure of attempts directed toward the manufacture of magnesia insulation blocks of densities lower than 9–10 lbs. per cubic ft. is that the normal magnesium carbonate-fiber components of the dilute slurries necessary for the production of such low density blocks do not have sufficient wet adherent strength and water holding capacity to retain the original mold dimensions during the molding and curing operation. Nor does a cured block resulting from the molding and curing of such high water content slurries have sufficient dry transverse strength or modulus of rupture to make it practical for use or for withstanding shipment and handling shocks.

Whereas in aqueous slurries of asbestos fibers and either basic magnesium carbonate crystals or elongated normal magnesium carbonate crystals, there is no physical bond between the asbestos fibers and the crystals, it has been discovered that an adhesive bond can be developed at points of contact between normal magnesium carbonate crystals and between these crystals and the asbestos fibers, by treating a concentrated slurry of such crystals and fibers with hot water in a manner hereinafter more particularly described.

The magnesia insulation block 10 which forms the subject of the present invention, is molded directly from a dilute, pre-reacted flocculent slurry under mechanical pressure in a filter mold while the mold is at least partially immersed in a bath of hot water. The thus molded block is given a partial heat curing treatment, preferably while completely immersed in hot water, and is then removed from the water and dried to complete its cure. The resulting molded block (Fig. 4) retains the precise dimensions of the mold and undergoes no shrinkage in volume during curing. The block structure is free of cracks and gas pockets and its major surface areas bear thereon imprints 11 of the screen linings of the perforated plates which form the major surface areas of the filter mold. The block structure includes an outer shell 12 of somewhat greater density than the core 14 and having a distinctly different orientation and lay of the asbestos fibers 16 as between the core and shell. The dried and cured block is comparatively hard and non-dusting and has smooth attractive surfaces. Blocks as low in density as 3.5 lbs per cubic ft. have been been made which have a modulus of rupture of approximately 7 lbs. per square inch. Blocks can be produced having densities in the range of 6–10 lbs. per cubic ft. and having a modulus of rupture in the range of 25–60 lbs. per square inch.

A feature of the preferred process is that it is designed for pressure filter molding the solids content of measured charges of dilute prereacted aqueous slurries of normal magnesium carbonate-asbestos fiber composition to precise final dimensions and form, followed by separation of the soft molded block from the mold side walls and further curing in contact with hot water while the block is supported by the mold base and is not confined by mold side walls. Prereaction of the normal carbonate-asbestos slurry is carried out under quiescent conditions at a temperature and for a time designed to develop an expanded flocculent form of slurry solids of such consistency and water retaining capacity that it can be rapidly molded and will then retain its original mold dimensions and form during subsequent hot water curing treatment outside the mold.

The process is adapted for molding insulation blocks from aqueous slurries containing reinforcing fibers such as chrysotile and amosite asbestos or mineral wool, and heat setting normal magnesium carbonate. To impart high temperature resistance the molding mixtures may include substantial proportions (30–70%) of inert filler materials such as diatomaceous silica and finely divided calcium carbonate.

The process has been designed particularly for semicontinuous and rapid pressure filter molding and heat curing operations. The apparatus includes means for introducing a prereacted slurry charge of measured solids content (by weight) and of predetermined consistency into a filter mold 18 wherein the charge solids are partially dewatered and shaped under mechanical pressure to precise final block dimensions. The thus molded wet solids block is advanced in stages while supported by a conveyor through a zone in which the block is given a preliminary heat curing treatment, preferably by direct contact immersion within a bath 19 of hot water to develop a shape retaining set. Final cure takes place while drying the block after its removal from the hot water bath.

The principal elements of the mold 18 (Figs. 1–2) include a flat perforated mold base plate 20 faced with fine mesh screen 21; a charging chamber or cylinder 22 which is relatively movable with respect to the base plate and the walls of which form side walls of the mold; and a piston 23 which is reciprocably mounted within the cylinder and which is perforated and faced with fine mesh screen to form a filtering top for the mold. The molding and preliminary heat curing operations take place beneath the surface of water bath 19 within a long vat or trough 24. An endless multiple flight conveyor 25 is mounted within trough 24. This conveyor embodies a pair of parallel endless roller link chains engaging sprocket wheels 26. The roller links may be further supported in the upper reach of the conveyor by tracks which extend substantially horizontally throughout a major portion of the length of trough 24. The conveyor carries a plurality of uniformly spaced flights 20. Each flight 20 is supported at opposite ends by brackets attached to the conveyor roller links, with its long sides at right angles to the conveyor chains. Each flight serves at only one position B in its path of travel as the base element of a variable volume filter mold. In subsequent positions of forward advance the flights support molded blocks 10 while the blocks are undergoing a preliminary heat curing treatment while immersed in hot water within the trough 24.

Figure 1:
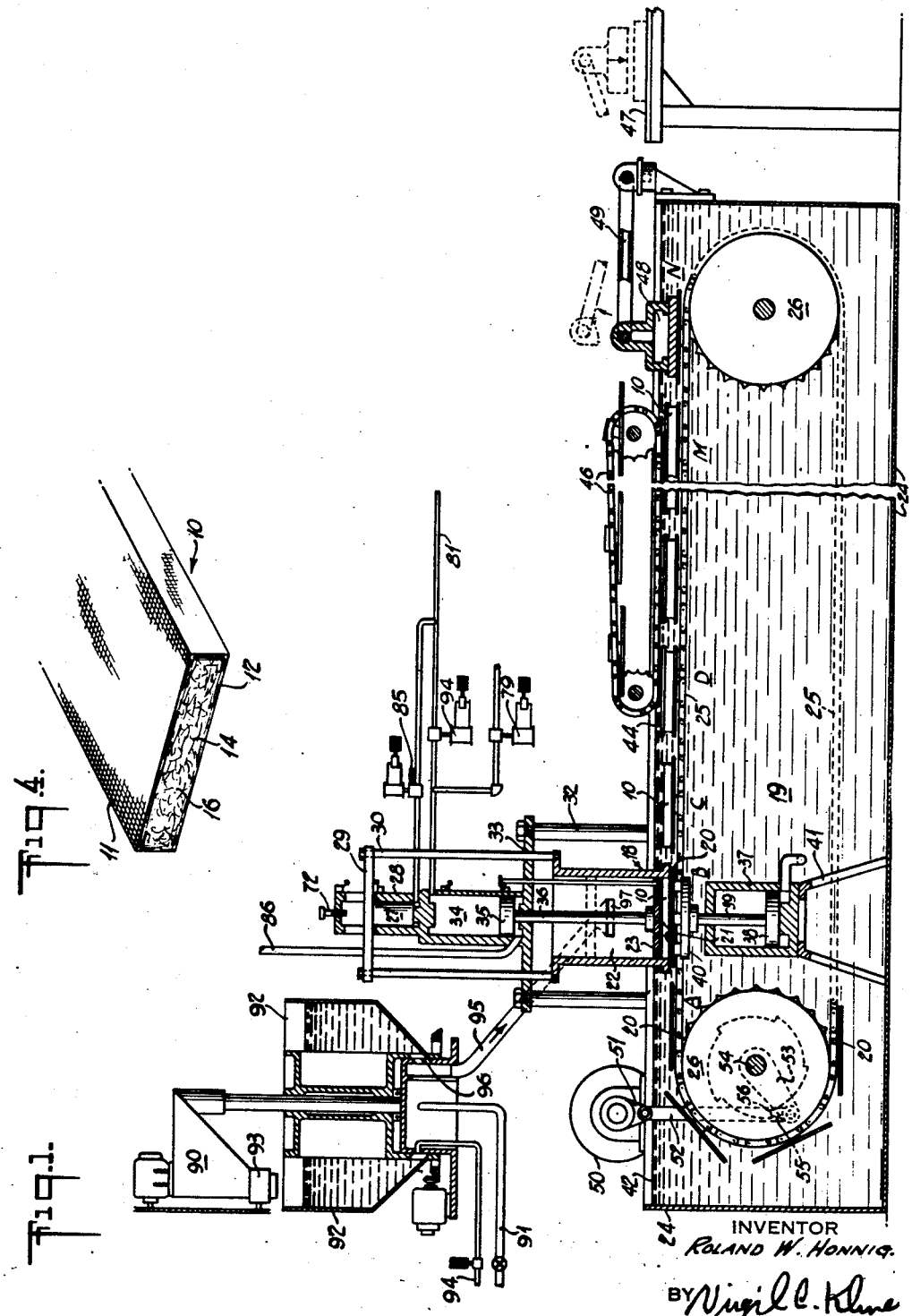
Fig. 1 is a diagrammatic view in side elevation (with parts broken away and parts shown in vertical section) illustrating a complete assembly of the preferred apparatus of the present invention.
Figure 2:
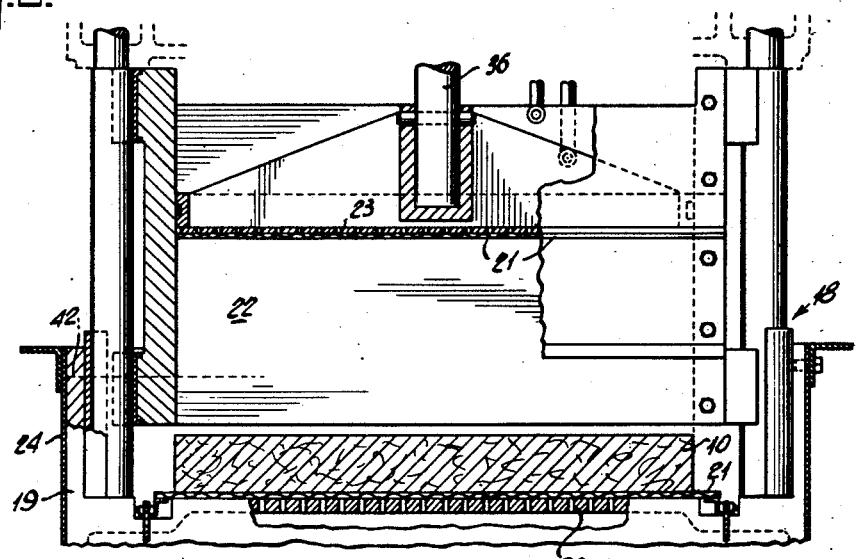
Fig. 2 is an enlarged front elevation (with parts shown in section) of a portion of the molding unit of Fig. 1.

Blocks 10 which are molded by the apparatus illustrated by Figs. 1 and 2 are rectangular blocks which may have, for example, the dimensions 36″ x 6″ x 2″. These dimensions are imparted during the molding operation when the piston 23 reaches the end of its downward stroke in cylinder 22, as portrayed in Fig. 1. In this mold the piston has a face area of 36″ x 6″ and the effective filtering face area of the mold base 20 is also 36″ x 6″. The total face area of plate 20 is made somewhat larger than the dimensions given in order to provide a peripheral seat on the top face of the plate for the bottom end of charging cylinder 22.

Means are shown for reciprocating the charging cylinder through a short vertical path aligned with one of the conveyor flights 20 at position B. The means for reciprocating cylinder 22 includes a piston 27 reciprocably mounted in a hydraulic pump 28. Vertical movement of piston 27 within the cylinder of pump 28 raises and lowers a cross-beam 29, and piston rods 30 couple the piston 27 and beam 29 to the upper end of cylinder 22. Cylinder 22 and its actuating mechanism are supported and guided by a frame including posts 32 and cross-beam 33. Piston 23 is reciprocated within cylinder 22 by actuating mechanism including a hydraulic cylinder 34 and a piston 35 mounted within said cylinder and connected to piston 23 by a piston rod 36.

A modification of the molding apparatus, which is also illustrated in Fig. 1, contemplates holding the charging cylinder 22 in a stationary position throughout a molding cycle, and reciprocating the upper reach of the conveyor in less taut condition to raise that one of the conveyor flights 20 which is in molding position B through a short vertical path sufficient to form a tight sealing seat against the base of the cylinder 22. The actuating means for vertically reciprocating a mold base flight 20 according to this modification has been shown as including a hydraulic cylinder 37 having a piston 38 therein which is connected by a rod 39 with a mold base supporting member 40. Member 40 is mounted immediately beneath conveyor 25 at the B position of one of the flights 20. Frame 41 rigidly supports cylinder 37 in fixed position within trough 24. The whole structure is designed to withstand any pressures applied to the mold charge and conveyor during the molding cycle.

After a molding cycle has been completed, the wet molded block 10 is released from the molds portrayed in Figs. 1 and 2, by either elevating the cylinder 22 or lowering the flight 20 away from the base of the cylinder. Conveyor 25 then advances the molded block, while supported by the flight 20 on which the block was originally formed, successively through positions C, D, etc. In all of these stages B, C, D, etc., the molded block is shown as immersed below the top level 42 of the hot water bath 19 in trough 24. It has been found desirable to confine the top of the block 10 during the major portion of its advance throughout the length of the hot water curing bath, as a means of preventing formation of gas pockets within the block and blisters at the top face of the block, caused by rapid and non-uniform escape of $CO_2$ gas from the block during the cure. This result is secured by applying a perforated flat plate 44 to the top surface of the block at position D and retaining such plate in position on the block until the block reaches a position designated M. Plate 44 may have approximately the same dimensions as those of the flights 20, and the plate is also preferably faced with a fine mesh screen which corresponds to the screen facings of plates 20 and piston 23. The individual screen faced plates 44 which are applied to the top surfaces of the block undergoing cure may be mounted as flights on an endless conveyor 46.

By the time that one of the conveyor flights 20 reaches position M in its travel throughout the length of trough 24, the block 10 which it supports has been cured to a shape retaining set, and means is therefore provided for lifting the cured block off its support 20 and transferring it to a pallet 47 on which the still wet block is transported through a conventional air dryer (not shown) wherein final curing and drying of the block takes place. A mechanism for lifting the block off the conveyor flight at position N has been shown as consisting of a suction cup 48 which is mounted on hinged arm 49. Raised positions of the hinged arm of the suction cup are indicated by dot-dash and broken line portrayals. The actuating mechanism for moving the conveyor 25 intermittently in stages comprises an electric motor 50 which is coupled by a crank arm 51 and a connecting rod 52 with a crank 53. The crank 53 is journaled for oscillation about a shaft 54 to which are keyed a pair of sprocket wheels 26. Pivotally mounted on crank 53 is a pawl 55 in position to engage the teeth of a ratchet gear 56 which is also keyed to shaft 54.

Figure 3:
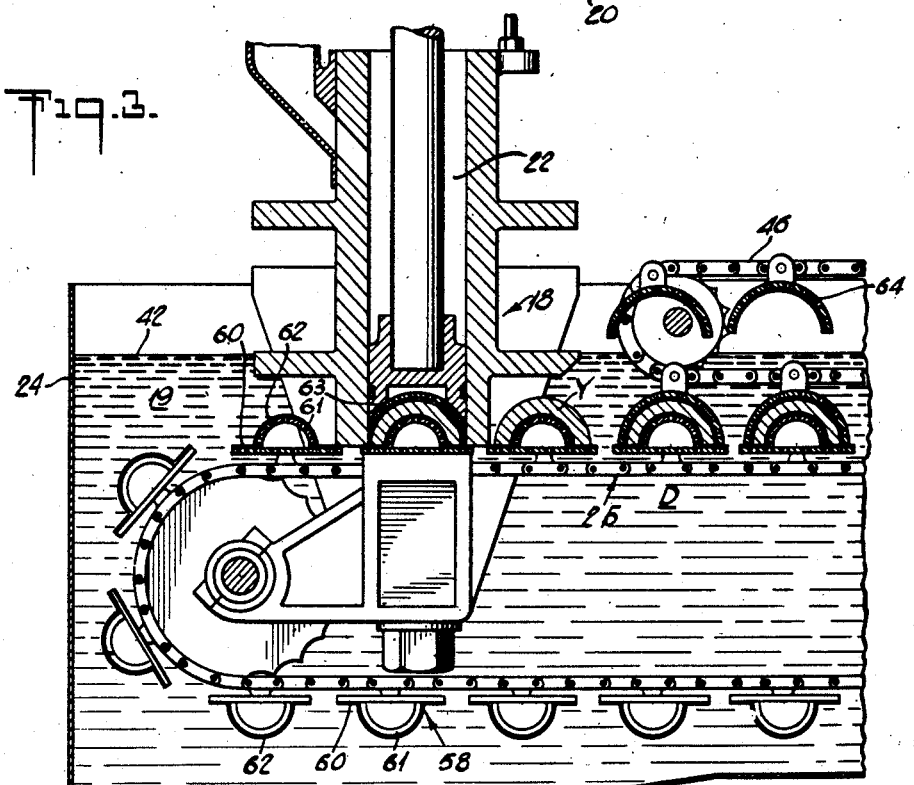
Fig. 3 is a diagrammatic view in side elevation (with parts shown in section) of a portion of a modified design of a molding and curing unit suitable for molding semi-tubular insulation blocks.

The mold 18 which is illustrated in Fig. 3 is designed for molding semi-cylindrical pipe insulation shapes or blocks Y. The mold base flights 58 which are mounted on conveyor 25 consist of perforated screen faced plates 60 each of which has a convex semi-cylindrical raised center 61 extending longitudinally throughout the length thereof and faced with fine mesh screen 62. The top surfaces of plates 60 and its raised central portion 61 conform to the dimensions of the concave face portion of the desired insulation block. The piston 63 which is shown as mounted in the charging cylinder 22 comprises a concave semi-cylindrical perforate plate which has the same dimensions and shape as the convex face of the pipe covering. This piston is also faced with fine mesh screen. The apparatus of Fig. 3 includes a conveyor 46 to which is attached a plurality of screen faced, semi-cylindrical perforated confining plates 64 each of which is applied to the convex face of molded block Y at position D and retained in contact with the block until the block has developed a shape retaining set. The apparatus which is shown in Fig. 3 is otherwise the same in design and operating principles as the apparatus shown in Figs. 1 and 2.

Figure 5:
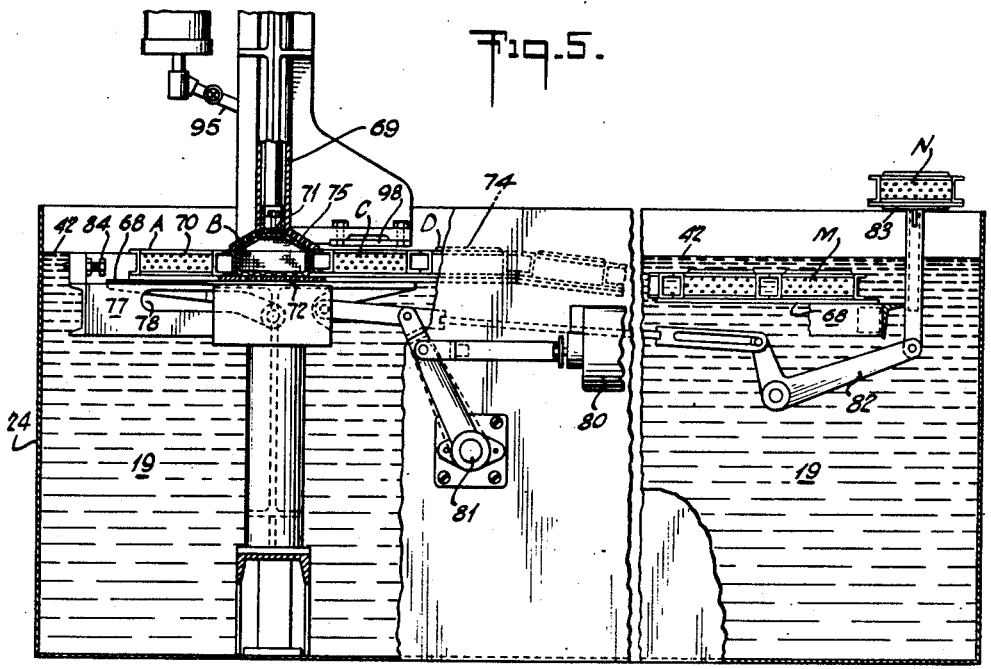
Fig. 5 is a view in side elevation (with parts broken away and parts shown in section) illustrating the complete assembly of apparatus of my aforementioned copending application.
Figure 6:
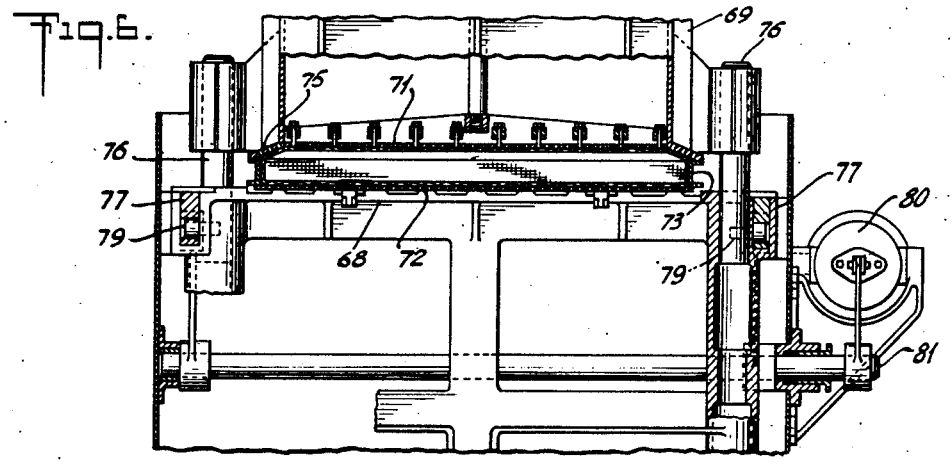
Fig. 6 is a view in front elevation (partly in section) of the molding unit of the apparatus of Fig. 5.

In the apparatus of Figs. 5 and 6 at the molding position B, the bottom 72 and side walls 73 of the mold 70 form the base elements of a variable volume mold having as its major side walls the imperforate walls of press 69 and having as its top the perforate piston 71. The bottom of charging cylinder or press 69 is shown as consisting of downwardly and outwardly flared perforate end flanges 75 lined with fine mesh screen. These flanges 75 form an outwardly flared frusto-conical bottom extension of the walls of the charging cylinder which is dimensioned to seat with a tight sealing fit on the upper rim of the side walls of mold 70.

Means for raising and lowering the press 69 in relation to the molds on the supporting tracks 68 include split collars supported by the flanges at the lower end of the members. Each collar is detachably clamped to a vertical plunger 76 which is in turn reciprocably journaled by a bearing in a supporting frame. The upper part of the frame also mounts horizontal bearings each of which journals a reciprocating cam 77 having a cam slot 78 in its side walls. Cam slots 78 are engaged by follower pin 79 which are in turn attached radially to plunger 76. The actuating mechanism for cams 77 is a hydraulic pump 80 the piston of which is coupled by rod and crank connection to an oscillating shaft 81. Shaft 81 is in turn connected to the cam 77 by crank arms. The right ends of cams 77 are connected by tie rods to oscillating crank 82 at the right end of trough 24. Crank 82 is in turn connected to actuate a vertical reciprocable mold elevating platform 83. The left ends of cams 77 support adjustable pusher pins 84 which reciprocate with the cams and which operate as the actuating elements for advancing (with delayed action) a train of molds on the supporting track through successive charging and curing positions A, B, C, etc.

The mold 85 which is illustrated in Fig. 7 may be used with the apparatus of Fig. 5 in place of the rectangular mold 70. Mold 85 is designed for molding semi-cylindrical pipe insulation shapes.

The base of the mold consists essentially of a screen faced flexible perforate semi-cylinder 86 mounted in a cradle 87. Element 86 has the shape and dimensions of the convex face of the desired pipe cover. The top element of the mold likewise consists of a screen faced flexible perforate plate 88 having a convex central portion 89 extending longitudinally thereof and which generally conforms to the dimensions and shapes of the concave face portion of the desired shape. This section 89 of the mold top is sufficiently flexible to form a longitudinal hinge for the flat section of the top, such hinge facilitating removal of the top plate from the concave surface of the mold pipe covering at the end of the preliminary curing operation. For filling a mold of this type the surface of the piston 71 is made convex in form and dimensioned to substantially conform with the concave portion of the top surface of the pipe covering.

In operation for producing magnesia insulation mixtures suitable for molding, an aqueous slurry containing normal magnesium carbonate crystals and asbestos fibers may be first formed. One method of forming a suitable slurry involves precipitating normal magnesium carbonate from a magnesium bicarbonate solution by subjecting the bicarbonate solution to severe agitation, as by aeration, at a temperature within the range 100–120° F. After most of the magnesium bicarbonate has been converted to normal carbonate the slurry is cooled to a temperature of about 80° F. to stabilize the normal magnesium carbonate. Asbestos fibers in proportions normally ranging between 8% and 20% by weight of the slurry solids may be added to the bicarbonate solution before precipitation of the normal carbonate crystals, or the asbestos fibers may be added to the slurry after precipitation of the normal carbonate. The slurry is then concentrated to a solids content preferably exceeding 15% by weight, as by filtering or by decantation. The concentrated slurry or filter cake is preferably subjected to agitation to impart plasticity thereto. The slurry may then be aged by allowing it to stand for a period of between 12 hours and 72 hours at a temperature not exceeding 80° F. This aging of the concentrated slurry has the effect of simplifying the ease of control of a subsequent prereaction treatment by which the slurry is conditioned for molding purposes.

By limiting the time of aerating a solution of magnesium bicarbonate liquor of say 3% concentration (basic magnesium carbonate equivalent) within a period of about 1 hour at a temperature of 80–120° F., with thorough agitation as in a turbo-aerator, a reactive form of elongated orthorhombic normal magnesium carbonate crystals can be produced having an average dimension of about 20–40 microns in length and 2–4 microns in maximum thickness.

To precondition the normal magnesium carbonate-asbestos fiber slurry for molding purposes, a measured charge of the concentrated slurry is placed in a tank 90, preferably at a temperature of about 80° F. The temperature of the slurry should not at any time exceed about 120° F. up to this point. A measured volume of hot water at a predetermined temperature of say 180–210° F. is introduced through a valve controlled pipe 91 into one of a rotatably mounted nest of tanks 92, and the tank thus charged with hot water is then rotated to a position immediately below the valve controlled outlet of tank 90. Valve 93 at the base of tank 90 is then opened and the measured charge of concentrated slurry is admixed with the hot water in tank 92. After mixing the hot water and slurry in tank 92 the charge is immediately agitated to secure uniform suspension (as by introducing compressed air from a valve controlled pipe 94 into the bottom of the hot water diluted slurry charge over a period of only a few seconds) after which the dilute slurry charge is allowed to stand quiescent within the tank 92 for a controlled time period while the thus charged tank is shifted about its central axis to a position shown at the right of the tank cluster shown in Fig. 1.

The weight of the concentrated slurry solids charged to tank 92, and the volume and temperature of the hot water admixed therewith, are carefully controlled and adjusted in accordance with the desired density and dimensions of the block which is to be molded. Also the length of time during which the dilute slurry is allowed to stand quiescent is carefully controlled. The concentration of slurry solids in the charge within tank 92 normally ranges from 1–8.5% by weight. The temperature of the charge during the period of quiescent standing may range between 140–180° F., and preferably within the range 150–170° F. A slurry of about 3½% solids concentration has been found to normally react within a period of 3–8 minutes of quiescent standing at a temperature of 160° F., to form large flocks of crystal-fiber aggregates of substantial water retaining capacity, the resulting reacted slurry somewhat resembling in appearance thick, incompletely cooked oatmeal porridge. The length of the period of quiescent standing to develop such flocculent condition of the slurry depends primarily on the temperature of the slurry. For example, if it takes 8 minutes for a slurry of predetermined solids concentration to develop a flocculent or "oatmeal" condition at a temperature of 160° F., it has been found that a period of about 4 minutes quiescent standing is necessary for a slurry of the same concentration to react to a flocculent state at a temperature of 170° F., and only about 2 minutes is required for the same slurry to react to the same flocculent state at a temperature of 180° F. The same slurry would require 16 minutes of quiescent standing to develop a suitable flocculent state at a temperature of 150° F. and about 32 minutes to develop a flocculent state at a temperature of 140° F. In other words, the reaction time is reduced approximately 50% for each 10° rise in reaction temperature.

During the period in which the hot water treated slurry of normal magnesium carbonate crystal and asbestos fibers stands in substantially quiescent state in developing the flocculent condition referred to as "oatmeal" slurry, the elongated microscopic crystals 65 of normal magnesium carbonate retain substantially their original shape and dimensions. During this period, however, these crystals develop bonds at points of contact with each other and with the asbestos fibers 66 in the slurry, and the volume or water retaining capacity of the slurry solids expands to form interlaced crystal fiber tufts or flocks 67 which impart to the slurry its oatmeal appearance. Such flocks or tufts build up to considerable size and exhibit substantial wet cohesive strength, apparently by reason of incipient formation in situ of small patches or films 99 of more basic or amorphous magnesium carbonate on the surfaces of the elongated normal carbonate crystals at the points of contact between crystals and between crystals and fibers. These patches or films of more basic carbonate provide adhesive bonds between the crystals and between the crystals and fibers, thereby developing interlaced fiber-crystal flocks having sufficient cohesive strength so that they do not settle appreciably while in dilute aqueous suspension during the initial stages of the molding operation, even when the mold is charged with slurries of very low solids concentration and of high water content.

When this prereacted "oatmeal" slurry is partially dewatered by filtering under atmospheric pressure, the amount of water which is retained within the interstitial pores of the wet slurry solids mass after a normal filtering period of say 5 minutes is at least about 2 to 4 parts of water for each part of solids by weight. This exceptionally high water retaining capacity of the prereacted slurry solids after removal of excess water is a characteristic which contributes to the usefulness of the partially dewatered slurry solids as a plastic insulating material which is adapted both for precision molding and for application by manual shaping or troweling as a thermal insulating cement to cover irregular surfaces such as valves or other pipe fittings.

Within a few minutes after the oatmeal slurry has been formed by quiescent standing after dilution and heating with hot water, the measured slurry charge is transferred from the tank 92 to mold 18 through a transfer pipe 95. During this charging operation an orifice at the head of the transfer pipe 95 registers with an orifice 96 in the base of the tank 92 which contains a dilute prereacted slurry charge. At the time that the measured reacted slurry charge enters mold 18 through a charging port 97, piston 23 is at the top of its stroke in cylinder 22 (indicated by dotted lines in Fig. 1) and the base of cylinder 22 is seated in tightly sealing relation against the top face of one of the conveyor flights 20 at position B in its path of travel. Also at the time of charging the mold the top level 42 of the water bath 19 in trough 24 is several inches above the level of the flight 20 forming the base of the mold. The temperature of the water in the bath 19 is preferably maintained within the range 180–210° F. As the mold is charged with slurry, hot water is displaced from the bottom of the mold through the water pervious base 20 into the bath 19. As soon as the measured charge has entered the mold the piston 23 is forced downwardly, thereby placing the charge under mechanical pressure and partially dewatering the wet solids content of the charge by filtering water out of the mold through the perforate base 20 and through the perforated piston 23. The screen facings of the mold base and piston top of the mold are sufficiently fine to substantially prevent loss of solids. The degree of pressure applied to the piston to force its downward descent governs the rate at which water is expressed from the charge and thereby governs the length of the mold cycle. Pressures as high as 100 lbs. per square inch of piston surface area may be safely employed, particularly during the later portions of the molding cycle. On completion of the molding stroke of the piston a predetermined weight of wet slurry solids has been compressed thereby into a wet solids block 10 having the precise form and dimensions of the desired insulating block.

The first step in releasing a wet solids block from the mold 18 consists of raising cylinder 22 off its seat against the top surface of the mold base 20 to break any suction seal and to free the lateral sides of the wet solids block 10 from contact with the sides of the cylinder 22. This upward movement of cylinder 22 is initiated prior to raising the piston 23 from its forward position in confining contact with the upper surface of the wet solids block. After both the cylinder 22 and the piston 23 have been raised to positions freeing the block 10 from their confining surfaces, conveyor 25 is operated by motor 50 to advance the thus formed wet solids block to a position C, at the same time advancing another conveyor flight from position A to position B as a preliminary to the beginning of another molding cycle. As soon as an unfilled conveyor flight has been thus advanced to position B the mold 18 is again closed, either by lowering the cylinder 22 to seating position against the top surface of said flight 20, or by raising the flight 20 and that portion of the conveyor adjacent the flight to bring the top surface of the flight in abutting tight sealing relation against the bottom of the cylinder 22. After the mold has thus been closed and the piston 23 raised to the top of its vertical stroke, another charge of prereacted slurry is introduced to the mold and the molding cycle is repeated.

Any water which filters through the piston 23 into the chamber overlying the piston during the molding cycle escapes from the chamber into the bath 19 as soon as it is no longer trapped by the walls of the cylinder and by the upper surface of the wet solids block. The molding cycle which is followed in using the apparatus portrayed in Fig. 3 for producing a wet solids block Y of semi-cylindrical shape is the same as previously described in connection with the operation of the apparatus of Figs. 1 and 2.

In operating the apparatus of Figs. 5 and 6, the molding cycle varies slightly from that previously described. When a major charge of prereacted slurry is introduced to the piston press 69, drainage of water starts immediately from the mold 70 which is beneath the press in position B, and is accelerated by the descent of the piston 71. After the piston has descended to the limit of its down stroke, the mold is filled with wet slurry solids and the top of the mold charge has been shaped to form a convex crown which fills the frusto-conical space between the bottom face of the piston and the confining side walls of the outwardly flared flange forming the bottom of the press. At the completion of the molding cycle the press is first raised off its seat on the upper rim of the mold to break any suction, after which the piston begins to move upwardly away from the top surface of the wet solids mold charge. After the press and piston have been elevated sufficiently to free the thus charged mold, the train of molds is advanced along track 68, shifting a thus filled mold from position B to position C while advancing an empty mold from position A to position B beneath the press. A new molding cycle is then initiated by lowering the press to the position illustrated where the end flanges seat on the upper rim of the mold side walls, and the variable volume mold thus formed is then charged with a measured charge of prereacted slurry as a preliminary to another molding cycle.

The crown of charge overfill which is formed at the top of the mold during the operation of the apparatus portrayed in Figs. 5 and 6 may have about ⅛ of the mold volume at the end of the molding operation at position B. This crown is subsequently compressed into a mold in a final charge shaping operation which takes place after the mold has been advanced to position C. This final compression of the wet slurry solids forming the charge to precise final mold dimensions may be effected by means of a screen faced perforated shoe 98 which is attached to the press and which reciprocates with the press. Thus, as the press moves downwardly to form a closed mold at the beginning of a molding cycle, shoe 98 also moves downwardly to compress the charge solids to final dimensions at the mold position C.

After completion of a molding cycle the conveying apparatus which is portrayed in the various drawings operates to advance a molded wet block from position C to a position D. At position D a screen faced and suitably shaped perforate confining cover plate (44, 64 or 74) is applied to the top surface of the wet solids block and is kept thereon during further advance of the molded block through the hot water curing section of the apparatus. The molded wet solids block advances in stages from a position D to a position M while completely immersed several inches below the top level of the hot water bath, and while the block is supported by a screen faced perforate mold base and is simultaneously confined at its top by a screen faced perforate cover plate. The length of this preliminary curing cycle depends chiefly on the temperature of the water bath 19 and on the degree of preliminary cure which it is desired to develop. With this water temperature at about 180–210° F. the curing cycle can usually be completed within a period of 5–10 minutes. By the end of this time conversion of the normal carbonate to basic carbonate is well advanced, and the block has developed sufficient shape retaining set to withstand fairly rough handling. At this stage of the preliminary set the wet solids block has advanced to the position M, at which position the conveyor 46 or equivalent means operates to remove any confining plate from contact with the top surface of the block, and other actuating mechanism such as suction member 48 of Fig. 1, or the platform 83 of Fig. 4, is operated to lift the wet solids block out of the hot water bath as it reaches position N in its path of travel through the curing trough. At this point the cured wet solids block which is produced in operating the apparatus of Figs. 5–7 is released from the confining side walls of the mold, by removing a pin connecting the hinges at one corner of the mold and separating the side walls from the block (Fig. 7). The final step in the process consists in depositing the still wet but partially cured blocks on a platen, and introducing the blocks to a drying oven preferably operated at a temperature of 220–350° F. Because of the tendency of a thus molded block of normal magnesium carbonate to expand rather than contract during the conversion of the normal carbonate to basic carbonate, no measurable shrinkage of the wet solids blocks 10 or Y occurs during the period required to effect complete cure and drying of the blocks.

A feature of the molds designed for molding blocks utilizing apparatus such as portrayed in Figs. 5 and 7, is that the mold sections may be rapidly disassembled and that each section may be separated from the adjacent face of the wet molded block by peeling the mold sections away from the face of the block in a direction at right angles to the block surface.

The filtering faces of the mold may be lined with screen at least as fine as about 40 x 40 mesh, to prevent loss of solids from the mold during the molding operation. In lieu of fine screen linings for this purpose, we may use mold wall plates having very narrow slit openings such as are employed as web forming screens in paper manufacture. The density of the blocks produced is determined by the amount of solids which is introduced into the mold. For molding magnesia insulation blocks of low densities ranging below say 8 lbs. per cubic ft. best results are obtained by limiting the solids concentration of the charging slurry within the range 1½–5½% by weight. The slurries having a solids concentration as low as 1% can be molded by allowing for a longer period of time to dewater the mold charge during the molding cycle.

During the development of a shape retaining set, the normal magnesium carbonate is gradually converted in situ to basic magnesium carbonate and this reaction involves evolution of $CO_2$ gas and considerable reduction of water of crystallization. In spite of the fact that water of crystalization is liberated during the curing of the block, it is desirable to employ hot water in direct contact with the block as the source of heat for effecting a preliminary cure to a self-supporting set. It is also preferred to completely immerse the wet solids block within a hot water bath during the molding and preliminary curing cycles. In this way curing heat is rapidly applied to the wet solids block by direct heat transfer, thereby effecting a rapid cure without serious danger of developing an overcure of the outside surfaces of the block. A block thus preliminarily cured by immersion in hot water offers no difficulty in removal from confining mold walls or supporting members after completion of the curing cycle, because it has no tendency to stick to the confining or supporting surfaces.

For producing a block of predetermined density the temperature and time of charge slurry prereaction are so regulated that the normal magnesium carbonate-asbestos slurry reacts and expands the necessary amount to produce an "oatmeal" type flocculent aggregate capable of completely filling the mold with a low density charge of moist solid material. If the prereaction temperature and time are insufficient, the resulting slurry charge does not have the necessary wet cohesive strength and stiffness or water retaining capacity to insure production of a shape retaining mold charge. If the temperature and reaction time are too great, excessive conversion to basic carbonate takes place, with the result that excessively high pressures are required to compress the charge material into the mold. Moreover, if the conversion operation is carried too far toward the basic carbonate state it becomes impossible to develop a strong bond, and the resulting product is a soft block of inadequate strength. For example, if the prereaction time is prolonged as much as 15 minutes at prereaction temperature after developing an oatmeal appearance before charging to the mold, the reaction may have gone so far that the resulting molded block cannot be properly cured under water to a strong initial set.

The following table presents comparative weights of charge solids in a mold charge (expressed as basic magnesium carbonate) and comparative slurry prereaction temperatures and times suitable for producing blocks of 2" x 6" x 36" size ranging in density between 4 and 10 lbs. per cubic ft:

| Density, lbs. cu. ft. | Weight of Mold Charge Basic Carb. Equiv. | Solids Concentration of Slurry, percent | Prereaction Temp. of Slurry, °F. | Time of Prereaction before Molding Min. |
|---|---|---|---|---|
| 10 | 2.5 | 5.5-8.5 | 150 | 1-3 |
| 8 | 2.0 | 3.5-5.5 | 160 | 1-4 |
| 6 | 1.5 | 1.5-3.5 | 160 | 2-5 |
| 4 | 1.0 | 1.4-3.5 | 160 | 4-6 |

Blocks of substantially the same density and strength characteristics may be produced when the slurry prereaction temperatures and times are varied in substantially inverse proportional relation, as follows:

| Density, lbs. cu. ft. | Weight of Mold Charge Basic Carb. Equiv. | Solids Concentration of Slurry, percent | Prereaction Temp. of Slurry, °F. | Time of Prereaction before Molding Min. |
|---|---|---|---|---|
| 8 | 2.0 | 3.5-5.5 | 140 | 30 |
| 8 | 2.0 | 3.5-5.5 | 150 | 15 |
| 8 | 2.0 | 3.5-5.5 | 160 | 7½ |
| 8 | 2.0 | 3.5-5.5 | 170 | 4 |
| 8 | 2.0 | 3.5-5.5 | 180 | 2 |

Assuming that all other molding conditions remain constant, including the prereaction time, increase in prereaction temperature over the range 140-180° F. has the effect of decreasing the density of blocks molded with the prereacted slurry. However, raising the prereaction temperature above 180° F. has the effect of increasing the density and reducing the strength of a resulting block, because of excessive conversion of normal magnesium carbonate to basic magnesium carbonate.

Molding slurries varying in concentration over the range 1.5-15% normal magnesium carbonate content by weight can be molded to produce blocks within the density range 3-10 lbs. per cubic ft. In producing a block of 3 lbs./cu. ft. density by the method herein described, the mold charge at the completion of the molding operation contains at least 12 parts by weight of uncombined water for each part of dry solids. Increase in the proportional ratio of reinforcing fiber to normal carbonate crystal in the slurry over the range 6-21% has the effect of decreasing the dry weight density of the resulting molded block. While asbestos fibers, and specifically amosite asbestos fibers, are the preferred reinforcing fibers, other reinforcing fibers which have been found to produce satisfactory and useful products include raw cotton, spun glass, fine rock wool and steam treated wood fibers. Blocks of lower density for a given strength are produced when amosite asbestos fibers make up a major proportion of the fibrous reinforcing material.

By the present process magnesia insulating blocks can be produced having a density as low as 3½ lbs. per cubic ft. and having an insulating coefficient, i. e. K factor, of about .33 at 200° F. The K factor is expressed in B. t. u./hr. passing through a 1 sq. ft. section area of material when the temperature gradient is 1° F. per inch of thickness. The thermal conductivities at a mean temperature of 300° F. range from about 0.4 for a block of 6 lb. density to 0.45 for a block of 10 lb. density. The transverse strengths of blocks made in accordance with the present invention vary from 7 lbs. per square inch for a 3½ lb. density block to 24 lbs. per square inch for a 6 lb. density block, to 40 lbs. per square inch for an 8 lb. density block, to 60 lbs. per square inch for a 10 lb. density block.

There are two principal factors which are relied upon to impart suitable strength to molded insulation blocks of the indicated low density in accordance with the present invention. One of these factors is in molding the blocks in molds having major surface areas perforated and filtering so as to develop a thin shell of somewhat greater density than the core, and in which the asbestos or other reinforcing fibers lie chiefly in overlying felted arrangement with an orientation parallel to the adjacent faces of the insulation block, while the fibers in the core are more heterogeneously disposed. The other factor contributing to the comparatively high strength of the low density block is the preliminary conditioning of the magnesium carbonate-fiber slurry by admixture with hot water and quiescent reaction just prior to its introduction to the mold. By this quiescent reaction voluminous flocks of fiber-normal magnesium carbonate crystal intermeshing lattices are developed in the slurry, and the necessary wet strength and bulk or water holding capacity is imparted to such flocks to permit of the use of a reacted slurry of low solids concentration in molding to precise dimensions a block of very low density. Prereaction of the slurry makes it possible to produce blocks of very low density while avoiding development of large pores or voids within the block structure. An incidental advantage of the prereaction is that the prereacted mold charge is made more free-filtering so that it is possible to complete the molding and dewatering operation in a very short period of time.

In the final mechanical pressure shaping of the wet solids charge the mold is so completely filled with slurry solids as to insure the production of a cured block having sharply defined faces and edges and having a strong structure. The entire operation is designed for shaping a block to precise dimensions so that the cured and dried block is ready for use just as it comes from the dryers. As thus produced the cured and dried block is a sound casting free of gas pockets and surface irregularities and possessing a hard and attractive surface bearing thereon imprints of the mold screen lining. During the molding and preliminary curing operations the perforated screen faced mold bases and confining upper plates function successively as dewatering filters and as gas collecting and gas liberating surfaces for $CO_2$ gas evolved during the preliminary curing treatment. The pervious screen lined confining plates which are applied to the top surfaces of the block during the preliminary curing theatment subject the block to slight pressure while affording direct access for water contact with all surfaces of the block.

The feature of immersing the mold beneath the hot water bath to a depth at least approximately as great as the thickness of the final block during the molding operation contributes substantially toward the production of a block of comparatively uniform structure throughout. By this operation any entrapment of air in the mold is avoided. The bottom portion of the mold is initially filled with water and this water leaves the mold at the rate at which the water is replaced by slurry charge, with the result that the water-solids equilibrium of the prereacted slurry charge is not seriously upset during the molding cycle and prior to the development of an initial shape retaining set. By employing a mechanical pressure molding unit operating on a mold charge of measured solids content by weight, and by applying a predetermined controlled pressure to effect dewatering and shaping of the charge to final dimensions, filling of all voids in the mold is assured and the partial dewatering is hastened and effected in a regular and rapid manner. It has been found that blocks can be molded in a molding cycle which can be completed within a very short period of say 15-20 seconds without the use of molding pressures which impart excessive density to the final block.

Since many variations may be made from the illustrative details given, without departing from the scope of the invention, it is intended that the invention should be limited only by the terms of the claims interpreted as broadly as consistent with novelty over the prior art.

What I claim is:

1. A method of manufacturing magnesia insulation blocks which comprises, forming an aqueous slurry comprising normal magnesium carbonate crystals and asbestos fibers, said slurry having a temperature not exceeding about 120° F., rapidly diluting and heating said slurry with hot water at a temperature and in amount sufficient to raise the temperature of the slurry to 140-180° F., maintaining the thus diluted and heated slurry quiescent for 2-30 minutes to develop therein voluminous flocks of lightly bonded interlaced crystals and fibers, partially dewatering and molding the wet solids content of said flocculent slurry under pressure, and developing a shape retaining set of the block by heating.

2. A method of manufacturing magnesia insulation blocks which comprises, forming a dilute aqueous slurry of 1-8.5% solids content containing normal magnesium carbonate crystals and asbestos fibers, holding said slurry quiescent at a temperature of about 150-180° F. for 2 to 16 minutes to develop therein a curdy aggregate of interlaced crystal-fiber flocks of large water holding capacity, partially dewatering and shaping the flocculent slurry under pressure in a filter mold while the mold is immersed in a hot water bath, and heat curing the shaped slurry solids.

3. A method of manufacturing magnesia insulation blocks which comprises, forming an aqueous slurry containing at least 15% solids by weight comprising normal magnesium carbonate crystals and reinforcing fibers, expanding the water holding volume of the slurry solids by diluting a measured charge of the slurry with hot water at a temperature and in amount sufficient to raise the slurry temperature within the approximate range 140-180° F., maintaining the thus diluted and heated slurry quiescent for 2-32 minutes to develop therein large flocks of interlaced crystals and fibers physically bonded at their points of contact with films of more basic amorphous magnesium carbonate formed in situ, partially dewatering and molding a measured charge of the thus flocculated slurry, and developing a shape retaining set by heating and drying the molded charge solids.

4. A method of manufacturing heat insulation blocks containing basic magnesium carbonate and reinforcing fibers which comprises, forming a concentrated slurry containing normal magnesium carbonate crystals, water and fibers, rapidly mixing hot water with said slurry at a temperature and in amount sufficient to reduce the solids concentration within the range 1.5-15% and to raise its temperature to 140-180° F., maintaining the hot slurry quiescent for a few minutes to develop therein voluminous crystal-fiber flocks, introducing said flocculent slurry into a filter mold and partially dewatering the slurry solids while molding them to a block form, heating the molded solids to develop a preliminary shape retaining set, and drying the set block at an elevated temperature.

5. In manufacturing insulation blocks comprising basic magnesium carbonate reinforced with asbestos fibers, the steps comprising, forming an aqueous slurry of 1-8.5% solids concentration containing asbestos fibers and normal magnesium carbonate crystals, subjecting the slurry to quiescent reaction at a temperature of about 140-180° F. while developing therein large flocks of interlaced fibers and crystals of substantial water holding capacity, introducing the flocculent slurry into a water pervious, solids impervious mold and dewatering the slurry solids until the mold is filled with a slurry of predetermined consistency, and heat curing the thus shaped block to develop a set.

6. In manufacturing moldable thermosetting magnesia insulation the steps comprising, forming a slurry of below 15% solids concentration containing normal magnesium carbonate crystals, water and reinforcing fibers, increasing the water holding capacity of the slurry solids by holding the slurry quiescent for 2-30 minutes while reacting it at a temperature of about 140-180° F. to develop therein voluminous crystal-fiber flocks, and partially dewatering the flocculent slurry.

7. In manufacturing a magnesia insulation block, the steps comprising, forming a slurry of normal magnesium carbonate crystals, water and asbestos fibers, rapidly diluting the slurry with hot water at a temperature and in amount sufficient to reduce the solids concentration below 8.5% and to raise its temperature to 140-180° F., allowing the hot slurry to stand quiescent to develop therein voluminous crystal-fiber flocks, introducing such flocculent slurry into a filter mold, partially dewatering the slurry solids while shaping them under pressure to fill the mold, and heating the thus shaped solids block to develop a shape retaining set.

8. A method of manufacturing magnesia insulation blocks which comprises, forming an aqueous slurry comprising normal magnesium carbonate crystals and asbestos fibers, maintaining said slurry quiescent at a temperature of 140-180° F. and at a solids concentration of 1-8.5% to develop therein voluminous crystal-fiber flocks, introducing a charge of said flocculent slurry into a filter mold, partially dewatering and shaping the charge and building up the wet solids content of the charge at the charging face of the mold, mechanically compressing the charge solids into the mold to form a block conforming to mold dimensions, and heating the block thus formed to develop a shape retaining set.

9. In molding and curing self-setting magnesium carbonate to produce blocks having finished attractive surfaces, the steps comprising, introducing into a filter mold a charge comprising aqueous normal magnesium carbonate and asbestos fiber slurry, partially dewatering the charge while filling the mold with the wet solids from said slurry, building up the wet solids content of the mold charge into a convex crown at the charging face of the mold while filling the mold corners and edges with slurry solids, the top of said crown projecting above the mold walls while the base of the crown is flush with the mold walls at the charging face, mechanically compressing the charge solids of the crown into the mold to form a block conforming to mold dimensions, and heating the block to impart a preliminary shape retaining set.

10. A method of manufacturing magnesia insulation blocks which comprises, decomposing magnesium bicarbonate liquor in the presence of reinforcing fibers to precipitate normal magnesium carbonate crystals on the surfaces of the fibers, forming an aqueous slurry comprising said normal magnesium carbonate crystals and fibers, said slurry having a temperature not exceeding about 120° F., rapidly diluting and heating said slurry with hot water at a temperature and in amount sufficient to raise the temperature of the slurry to about 140–180° F., maintaining the thus diluted and heated slurry quiescent while developing therein voluminous flocks of physically bonded interlaced crystals and fibers, pressure filter molding the wet solids content of said flocculent slurry to form a block, and developing a shape retaining set of the block by contacting it with a heating fluid.

11. A method of manufacturing magnesia insulation blocks which comprises, subjecting a measured change of a dilute aqueous slurry of 1.5–15% solids concentration containing normal magnesium carbonate crystals and reinforcing fibers to quiescent reaction at a temperature of about 140° F. to 180° F. to develop therein large flocks of lightly bonded interlaced fibers and crystals, rapidly removing water from said flocculent slurry while filter molding the wet solids content thereof to final block form and dimensions by applying mechanical pressure thereto, and heating the thus molded block to develop a shape retaining set.

12. The method of manufacturing magnesia insulation blocks which comprises, providing an aqueous slurry of at least 15% solids concentration comprising normal magnesium carbonate crystals and reinforcing fibers, said slurry having a temperature in the range 80–120° F., rapidly diluting and heating said slurry by mixing hot water therewith at a temperature and in amount sufficient to raise the temperature of the slurry to 140–180° F., maintaining the thus diluted and heated slurry quiescent for a period of 2–30 minutes sufficient to develop therein large flocks of interlaced fibers and crystals, the length of said quiescent period varying substantially inversely with the hot slurry temperature, partially dewatering the slurry, molding the solids content thereof, and heat curing the resulting molded solids to develop a shape retaining set.

13. A method of manufacturing magnesia insulation blocks which comprises, forming an aqueous slurry comprising normal magnesium carbonate crystals and reinforcing fibers, subjecting said slurry to quiescent reaction for a period of 2–30 minutes at a temperature within the approximate range 140–180° F. to develop therein a flocculent suspension of voluminous tufts of lightly bonded fiber-crystal lattices, charging a mold with a measured amount of said flocculent slurry to shape the wet solids content thereof to block form and dimensions, and heating the molded block to impart a shape retaining set.

14. In manufacturing insulation blocks comprising basic magnesium carbonate reinforced with fibers, the steps comprising charging a filter mold with an aqueous slurry comprising fibers and normal magnesium carbonate crystals, pressure filter molding the slurry solids while partially dewatering the charge, immersing the mold and mold charge in direct contact with water at a temperature of from 180–210° F. during the charging and molding operations, and heat curing and drying the thus formed block.

ROLAND W. HONNIG.

REFERENCES CITED

The following references are of record in the file of this patent:

UNITED STATES PATENTS

| Number | Name | Date |
| --- | --- | --- |
| 1,982,542 | Seigle | Nov. 27, 1934 |
| 2,209,752 | Abrahams et al. | July 30, 1940 |
| 2,335,242 | Greider et al. | Nov. 30, 1943 |
| 2,409,297 | McGarvey | Oct. 15, 1946 |
| 2,413,958 | Dinkfeld et al. | Jan. 7, 1947 |
| 2,428,555 | Cummins et al. | Oct. 7, 1947 |